US012424622B2

(12) United States Patent
Ono

(10) Patent No.: US 12,424,622 B2
(45) Date of Patent: Sep. 23, 2025

(54) SECONDARY BATTERY

(71) Applicant: MURATA MANUFACTURING CO., LTD., Kyoto (JP)

(72) Inventor: Takamasa Ono, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 521 days.

(21) Appl. No.: 17/950,343

(22) Filed: Sep. 22, 2022

(65) Prior Publication Data
US 2023/0014480 A1 Jan. 19, 2023

Related U.S. Application Data

(63) Continuation of application No. PCT/JP2020/042563, filed on Nov. 16, 2020.

(30) Foreign Application Priority Data

Mar. 27, 2020 (JP) ................................ 2020-058204

(51) Int. Cl.
*H01M 4/00* (2006.01)
*H01M 4/525* (2010.01)
(Continued)

(52) U.S. Cl.
CPC ....... *H01M 4/525* (2013.01); *H01M 10/0525* (2013.01); *H01M 10/0567* (2013.01);
(Continued)

(58) Field of Classification Search
CPC . H01M 4/525; H01M 10/0567; H01M 50/105
See application file for complete search history.

(56) References Cited

U.S. PATENT DOCUMENTS

2004/0013946 A1 1/2004 Abe et al.
2008/0102369 A1 5/2008 Sakata et al.
(Continued)

FOREIGN PATENT DOCUMENTS

JP 2008108586 A 5/2008
JP 2012138335 A 7/2012
(Continued)

OTHER PUBLICATIONS

Japanese Office Action issued Sep. 5, 2023 in corresponding Japanese Application No. 2022-509245.
(Continued)

*Primary Examiner* — Tiffany Legette
*Assistant Examiner* — Monique M Wills
(74) *Attorney, Agent, or Firm* — K&L Gates LLP

(57) ABSTRACT

A secondary battery includes a positive electrode, a negative electrode, and an electrolytic solution. The positive electrode includes a positive electrode active material. The electrolytic solution includes a multi-nitrile compound. The positive electrode active material includes a lithium-nickel composite oxide and a boron compound. The lithium-nickel composite oxide has a layered rock-salt crystal structure. The positive electrode active material has a crystallite size of a (104) plane that is greater than or equal to 40.0 nm and less than or equal to 74.5 nm. The crystallite size is calculated by X-ray diffractometry and Scherrer equation. The positive electrode active material has an element concentration ratio that is greater than or equal to 0.15 and less than or equal to 0.90. The element concentration ratio is calculated on the basis of a B1s spectrum, a $Ni2p_{3/2}$ spectrum, a $Co2p_{3/2}$ spectrum, a $Mn2p_{1/2}$ spectrum, and an Al2s spectrum of the positive electrode active material detected by X-ray photoelectron spectroscopy.

11 Claims, 5 Drawing Sheets

(51) Int. Cl.
  H01M 10/0525 (2010.01)
  H01M 10/0567 (2010.01)
  H01M 50/105 (2021.01)
  H01M 4/02 (2006.01)

(52) U.S. Cl.
  CPC .... H01M 50/105 (2021.01); *H01M 2004/028* (2013.01); *H01M 2300/0025* (2013.01)

(56) References Cited

U.S. PATENT DOCUMENTS

| | | | | |
|---|---|---|---|---|
| 2014/0370347 | A1* | 12/2014 | Jung | H01M 50/119 |
| | | | | 429/94 |
| 2015/0380769 | A1* | 12/2015 | Chiga | H01M 10/0569 |
| | | | | 429/343 |
| 2016/0013476 | A1 | 1/2016 | Oh et al. | |
| 2016/0164077 | A1 | 6/2016 | Hwang et al. | |
| 2016/0301104 | A1 | 10/2016 | Shi et al. | |
| 2020/0006810 | A1* | 1/2020 | Lee | H01M 10/052 |
| 2020/0185709 | A1 | 6/2020 | Zhou et al. | |
| 2021/0367230 | A1 | 11/2021 | Ouki et al. | |

FOREIGN PATENT DOCUMENTS

| | | |
|---|---|---|
| JP | 2013030284 A | 2/2013 |
| JP | 2013051207 A | 3/2013 |
| JP | 2015144108 A | 8/2015 |
| JP | 2015536558 | 12/2015 |
| JP | 2015536558 A | 12/2015 |
| JP | 2016536776 A | 11/2016 |
| WO | 2018003448 A1 | 1/2018 |
| WO | 2019040533 A1 | 2/2019 |
| WO | 2020162277 A1 | 8/2020 |

OTHER PUBLICATIONS

International Search Report of corresponding PCT application PCT/JP2020/042563, dated Jan. 19, 2021.

* cited by examiner

SECONDARY BATTERY

CROSS REFERENCE TO RELATED APPLICATIONS

The present application is a continuation of PCT patent application no. PCT/JP2020/042563, filed on Nov. 16, 2020, which claims priority to Japanese patent application no. JP2020-058204, filed on Mar. 27, 2020, the entire contents of which are herein incorporated by reference.

BACKGROUND

The present application relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, to improve a characteristic such as a cyclability characteristic, an electrolytic solution includes a dinitrile compound. In some cases, the dinitrile compound is used in combination with 4-fluoro-1,3-dioxolane-2-one. To improve a characteristic such as a cyclability characteristic, a nickel-based lithium-containing composite oxide is used as a positive electrode active material and a surface of the lithium-containing composite oxide is modified by a surface modification compound including a particular element.

SUMMARY

The present application relates to a secondary battery.

Although consideration has been given in various ways to improve performance of a secondary battery, a capacity characteristic, a swelling characteristic, and a cyclability characteristic are each not sufficient yet, and there is still room for improvement.

The present technology has been made in view of such an issue, and thus relates to providing a secondary battery that is able to obtain a superior capacity characteristic, a superior swelling characteristic, and a superior cyclability characteristic according to an embodiment.

A secondary battery according to an embodiment includes a positive electrode, a negative electrode, and an electrolytic solution. The positive electrode includes a positive electrode active material. The electrolytic solution includes a multi-nitrile compound. The positive electrode active material includes a lithium-nickel composite oxide and a boron compound. The lithium-nickel composite oxide has a layered rock-salt crystal structure represented by Formula (1) below. The positive electrode active material has a crystallite size of a (104) plane that is greater than or equal to 40.0 nm and less than or equal to 74.5 nm. The crystallite size is calculated by X-ray diffractometry and Scherrer equation. The positive electrode active material has an element concentration ratio represented by Expression (2) below that is greater than or equal to 0.15 and less than or equal to 0.90. The element concentration ratio is calculated on the basis of a B1s spectrum, a Ni2p$_{3/2}$ spectrum, a Co2p$_{3/2}$ spectrum, a Mn2p$_{1/2}$ spectrum, and an Al2s spectrum of the positive electrode active material detected by X-ray photoelectron spectroscopy.

$$Li_aNi_{1-b}M_bO_c \tag{1}$$

where:
M is at least one of Co, Fe, Mn, Cu, Zn, Al, Cr, V, Ti, Mg, or Zr; and
a, b, and c satisfy 0.8<a<1.2, 0≤b≤0.5, and 0<c<3.

$$R=I2/I1 \tag{2}$$

where:
R is the element concentration ratio;
I1 is sum total of a Ni concentration in atomic percent, a Co concentration in atomic percent, a Mn concentration in atomic percent, and an Al concentration in atomic percent that are calculated on the basis of the Ni2p$_{3/2}$ spectrum, the Co2p$_{3/2}$ spectrum, the Mn2p$_{1/2}$ spectrum, and the Al2s spectrum, respectively; and
I2 is a B concentration in atomic percent calculated on the basis of the B1s spectrum.

Here, the term "multi-nitrile compound" is a generic term for a compound including two or more nitrile groups (—CN). The term "boron compound" is a generic term for a compound including boron as a constituent element. Details of each of the multi-nitrile compound and the boron compound will be described later.

According to the secondary battery of an embodiment, the positive electrode active material of the positive electrode includes the lithium-nickel composite oxide and the boron compound; the electrolytic solution includes the multi-nitrile compound; the crystallite size of the (104) plane of the positive electrode active material is greater than or equal to 40.0 nm and less than or equal to 74.5 nm; and the element concentration ratio of the positive electrode active material is greater than or equal to 0.15 and less than or equal to 0.90. This makes it possible to obtain a superior capacity characteristic, a superior swelling characteristic, and superior cyclability.

Note that effects of the present technology are not necessarily limited to those described herein and may include any of a series of suitable effects in relation to the present technology.

DETAILED DESCRIPTION

The present technology is described below in further detail including with reference to the drawings according to an embodiment.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is greater than an electrochemical capacity per unit area of the positive electrode.

The electrode reactant is not particularly limited in kind, and specifically, is a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Here, a description is given of a configuration of the secondary battery, and then of a physical property of a positive electrode active material.

Figure 1:
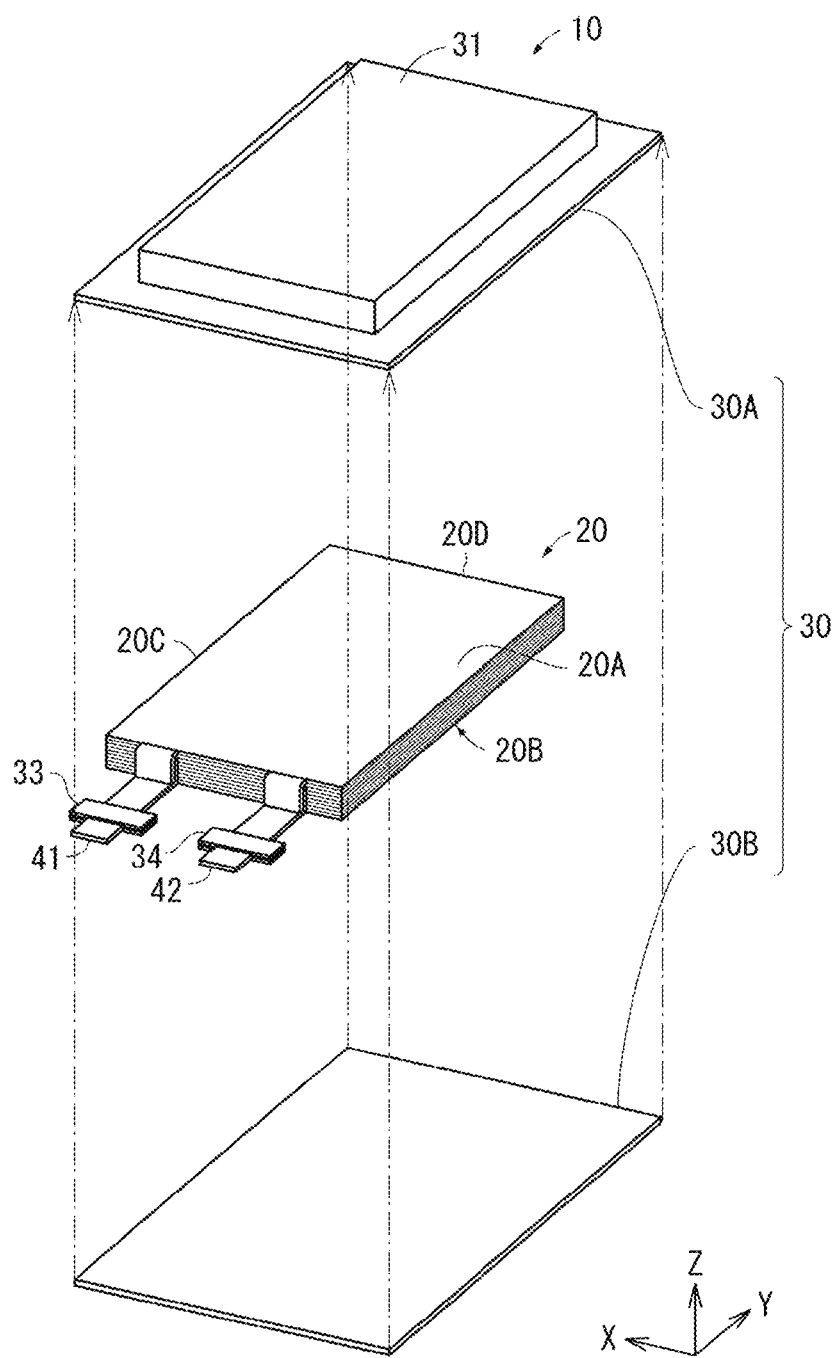
FIG. 1 is a perspective view of a configuration of a secondary battery according to an embodiment of the present technology.
Figure 2:
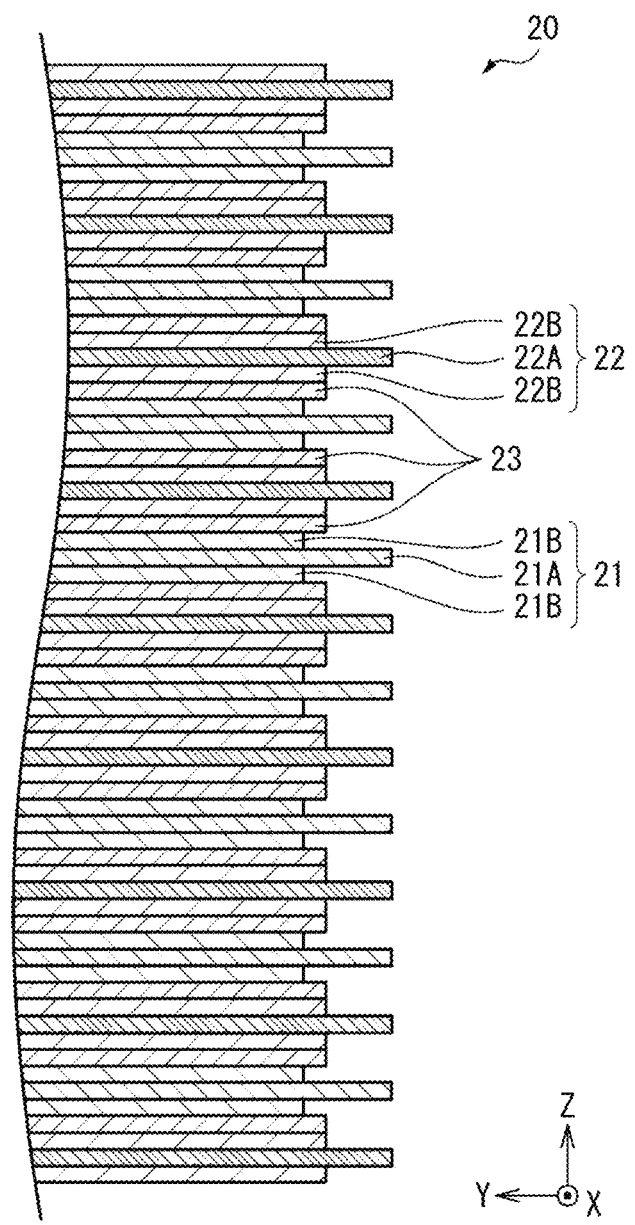
FIG. 2 is a sectional view of a configuration of a battery device illustrated in FIG. 1.
Figure 3:
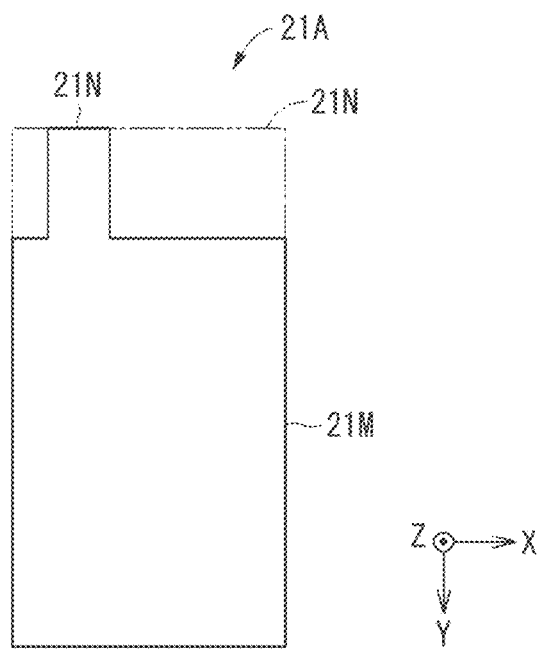
FIG. 3 is a plan view of a configuration of a positive electrode current collector illustrated in FIG. 2.
Figure 4:
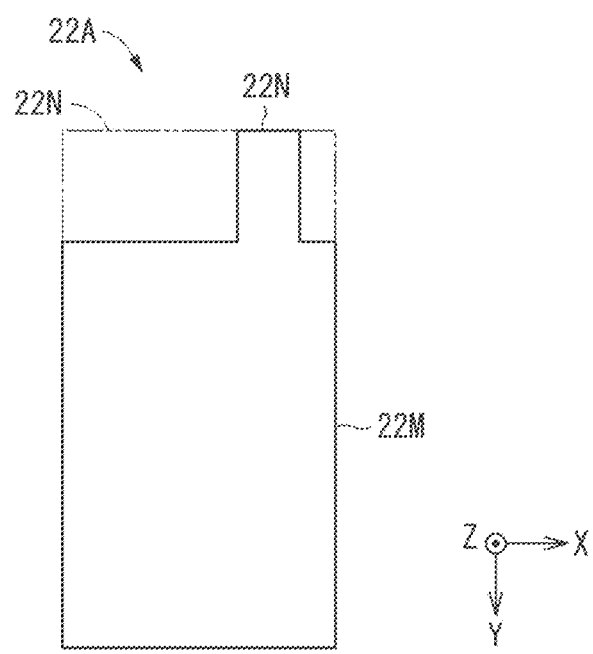
FIG. 4 is a plan view of a configuration of a negative electrode current collector illustrated in FIG. 2.

FIG. 1 is a perspective configuration of a secondary battery 10 that is the secondary battery according to an embodiment of the present technology. FIG. 2 illustrates a sectional configuration of a battery device 20 illustrated in FIG. 1. FIG. 3 illustrates a plan configuration of a positive electrode current collector 21A illustrated in FIG. 2. FIG. 4 illustrates a plan configuration of a negative electrode current collector 22A illustrated in FIG. 2.

Note that FIG. 1 illustrates a state in which the battery device 20 and an outer package film 30 are separated away from each other. The outer package film 30 includes film members 30A and 30B. FIG. 2 illustrates a state before positive electrode current collectors 21A (exposed parts 21N illustrated in FIG. 3) are joined to each other and before negative electrode current collectors 22A (exposed parts 22N illustrated in FIG. 4) are joined to each other.

As illustrated in FIG. 1, the secondary battery 10 includes the battery device 20, the outer package film 30, a positive electrode lead 41, and a negative electrode lead 42. The secondary battery 10 described here is a non-aqueous electrolyte secondary battery of a laminated-film type that includes an outer package member having flexibility or softness, i.e., the outer package film 30, to contain the battery device 20. Such a secondary battery 10 allows for reduction in size, weight, and thickness.

The outer package film 30 contains the battery device 20 as described above, and thus contains the positive electrode 21, the negative electrode 22, and an electrolytic solution that are to be described later.

As illustrated in FIG. 1, the outer package film 30 includes two film-shaped members, i.e., the film members 30A and 30B, that are separated from each other. The film members 30A and 30B are overlaid on each other with the battery device 20 interposed therebetween. Outer edges of four sides of the film member 30A and outer edges of four sides of the film member 30B are adhered to each other to form an adhered part at the edges of the outer package film 30. The outer package film 30 thus has a pouch-shaped structure that allows the battery device 20 to be sealed therein. Note that the film member 30A has a depression part 31 to place the battery device 20 therein. The depression part 31 is a so-called deep drawn part.

Specifically, each of the film members 30A and 30B is a three-layered laminated film including a fusion-bonding layer, a metal layer, and a surface protective layer that are stacked in this order from an inner side. In this case, in a state in which the film members 30A and 30B are overlaid on each other, outer edges of four sides of the fusion-bonding layers opposed to each other are fusion-bonded to each other. The fusion-bonding layer includes a polymer compound such as polypropylene. The metal layer includes a metal material such as aluminum. The surface protective layer includes a polymer compound such as nylon. Note that the outer edges of the four sides of the fusion-bonding layers opposed to each other may be adhered to each other by means of an adhesive.

The outer package film 30 is not particularly limited in configuration or the number of layers, and may be single-layered or two-layered, or may include four or more layers. In other words, the outer package film 30 is not limited to a laminated film, and may be a single-layer film.

A sealing film 33 is interposed between the outer package film 30 and the positive electrode lead 41. A sealing film 34 is interposed between the outer package film 30 and the negative electrode lead 42. The sealing films 33 and 34 are each a member that prevents entry of, for example, outside air into the outer package film 30. The sealing film 33 includes one or more of polymer compounds, including polyolefin, that have adherence to the positive electrode lead 41. The sealing film 34 includes one or more of polymer compounds, including polyolefin, that have adherence to the negative electrode lead 42. Examples of the polyolefin include polyethylene, polypropylene, modified polyethylene, and modified polypropylene. Note that the sealing film 33, the sealing film 34, or both may be omitted.

As illustrated in FIGS. 1 and 2, the battery device 20 is contained inside the outer package film 30, and includes the positive electrode 21, the negative electrode 22, a separator 23, and the electrolytic solution (not illustrated). The battery device 20 includes a major surface 20A and a major surface 20B. The major surface 20B is provided on an opposite side to the major surface 20A. The major surface 20A includes longer sides 20C and shorter sides 20D. The positive electrode 21, the negative electrode 22, and the separator 23 are each impregnated with the electrolytic solution.

Here, the battery device 20 is a stacked electrode body, i.e., a structure in which the positive electrode 21 and the negative electrode 22 are alternately stacked with the separator 23 interposed therebetween. The positive electrode 21 and the negative electrode 22 are thus opposed to each other with the separator 23 interposed therebetween.

As illustrated in FIG. 2, the positive electrode 21 includes the positive electrode current collector 21A having two opposed surfaces, and two positive electrode active material layers 21B provided on the respective two opposed surfaces of the positive electrode current collector 21A. Note that the positive electrode active material layer 21B may be provided only on one of the two opposed surfaces of the positive electrode current collector 21A.

As illustrated in FIG. 3, the positive electrode current collector 21A includes a formation part 21M and the exposed part 21N. The formation part 21M is provided with the positive electrode active material layer 21B. The exposed part 21N is provided with no positive electrode active material layer 21B. The positive electrode active material layer 21B is provided on each of two opposed surfaces of the formation part 21M, as described above. The exposed part 21N is a part that extends to protrude from a portion of the formation part 21M. The exposed part 21N has a width smaller than a width of the formation part 21M. The width refers to a dimension in an X-axis direction. However, as illustrated by a dash-dot-dot-dash line in FIG. 3, the exposed part 21N may have the same width as the formation part 21M. The multiple exposed parts 21N are joined to each other, and the positive electrode lead 41 is coupled to the joined exposed parts 21N.

The positive electrode current collector 21A includes one or more of electrically conductive materials including, without limitation, a metal material. Examples of the metal material include aluminum, nickel, and stainless steel. The positive electrode active material layer 21B includes one or more of positive electrode active materials into which lithium is insertable and from which lithium is extractable. The positive electrode active material layer 21B may further include, for example, a positive electrode binder and a positive electrode conductor. A method of forming the positive electrode active material layer 21B is not particularly limited, and specifically, includes one or more of methods including, without limitation, a coating method.

The positive electrode active material includes a lithium-containing compound, and more specifically, includes a lithium-nickel composite oxide and a boron compound. A reason for this is that a high energy density is obtainable and a decomposition reaction of the electrolytic solution due to the positive electrode 21 upon charging and discharging is suppressed. This makes it possible to obtain a high battery capacity even with a low voltage. In addition, because gas generation due to the decomposition reaction of the electrolytic solution upon charging and discharging is suppressed, the secondary battery is prevented from swelling easily. In addition, because the decomposition reaction of the electrolytic solution is suppressed, a discharge capacity is prevented from decreasing easily even if charging and discharging are repeated.

The lithium-nickel composite oxide includes one or more of compounds represented by Formula (1) below. Note that a composition of lithium differs depending on a charge and discharge state, and a value of "a" represents a value in a completely discharged state.

$$Li_aNi_{1-b}M_bO_c \qquad (1)$$

where:
M is at least one of Co, Fe, Mn, Cu, Zn, Al, Cr, V, Ti, Mg, or Zr; and
a, b, and c satisfy $0.8<a<1.2$, $0\le b\le 0.5$, and $0<c<3$.

As apparent from Formula (1), the lithium-nickel composite oxide is an oxide that includes lithium and nickel as constituent elements, and further includes an additional metal element (M).

As apparent from a possible value range of b ($0\le b\le 0.5$), the lithium-nickel composite oxide may or may not include the additional metal element (M).

A content of nickel (a value of 1−b) is determined depending on a content of the additional metal element (M) (a value of b). In this case, the value of b is not particularly limited as long as the condition of $0\le b\le 0.5$ is satisfied as described above. Accordingly, the value of 1−b satisfies the following condition: $0.5\le 1-b\le 1.0$.

In particular, b preferably satisfies $0.1\le b\le 0.2$. In other words, 1−b preferably satisfies $0.8\le 1-b\le 0.9$. A reason for this is that the decomposition reaction of the electrolytic solution due to the positive electrode 21 upon charging and discharging is further suppressed while a high energy density is maintained. Accordingly, because the gas generation due to the decomposition reaction of the electrolytic solution upon charging and discharging is further suppressed, the secondary battery is further prevented from swelling easily. In addition, because the decomposition reaction of the electrolytic solution is further suppressed, the discharge capacity is further prevented from decreasing easily even if charging and discharging are repeated.

Specific examples of the lithium-nickel composite oxide include $LiNiO_2$, $LiNi_{0.50}Co_{0.20}Al_{0.30}O_2$, $LiNi_{0.60}Co_{0.20}Al_{0.20}O_2$, $LiNi_{0.80}Co_{0.15}Al_{0.05}O_2$, $LiNi_{0.90}Co_{0.07}Al_{0.03}O_2$, $LiNi_{0.92}Co_{0.05}Al_{0.03}O_2$, $LiNi_{0.50}Co_{0.20}Mn_{0.30}O_2$, and $LiNi_{0.60}Co_{0.20}Mn_{0.20}O_2$. However, the specific examples of the lithium-nickel composite oxide may include any compound other than the above-described examples as long as the compound satisfies the condition represented by Formula (1).

The term "boron compound" is a generic term for a compound that includes boron as a constituent element, as described above. A specific example of the boron compound includes one or more of boric acid ($H_3BO_3$), lithium tetraborate ($Li_2B_4O_7$), ammonium pentaborate ($NH_4B_5O_8$), lithium metaborate ($LiBO_2$), or boron oxide ($B_2O_3$).

A specific configuration of the positive electrode active material including the lithium-nickel composite oxide and the boron compound is not particularly limited. Here, a surface of the lithium-nickel composite oxide is covered with the boron compound, as will be described later. That is, the positive electrode active material includes the lithium-nickel composite oxide and the boron compound covering the surface of the lithium-nickel composite oxide. A reason for this is that it allows the surface of the lithium-nickel composite oxide to be electrochemically stable, therefore making it easier to suppress a decomposition reaction of the electrolytic solution on the surface of the lithium-nickel composite oxide.

The positive electrode active material that includes the lithium-nickel composite oxide and the boron compound has a predetermined physical property to improve performance of the secondary battery 10. Details of the physical property of the positive electrode active material will be described later.

Note that as long as the positive electrode active material includes the above-described lithium-nickel composite oxide and the boron compound, the positive electrode active material may further include one or more of other lithium-containing compounds. The other lithium-containing compounds may be other lithium-containing compounds having the layered rock-salt crystal structure, lithium-containing compounds having a spinel crystal structure, or lithium-containing compounds having an olivine crystal structure. Specific examples of the other lithium-containing compounds having the layered rock-salt crystal structure include a lithium composite oxide such as $LiCoO_2$. Specific examples of the lithium-containing compounds having the spinel crystal structure include a lithium composite oxide such as $LiMn_2O_4$. Specific examples of the lithium-containing compounds having the olivine crystal structure include a lithium phosphoric acid compound such as $LiFePO_4$, $LiMnPO_4$, or $LiMn_{0.5}Fe_{0.5}PO_4$.

In addition, the positive electrode active material may further include one or more of compounds that do not include lithium as a constituent element, i.e., non-lithium-containing compounds. Specific examples of the non-lithium-containing compounds include an inorganic compound such as $MnO_2$, $V_2O_5$, $V_6O_{13}$, NiS, or MoS.

The positive electrode binder includes one or more of polymer materials including, without limitation, polyvinylidene difluoride, polytetrafluoroethylene, polyacrylonitrile, styrene-butadiene rubber, and carboxymethyl cellulose. Note that the positive electrode binder may be a copolymer of two or more of the polymer materials.

The positive electrode conductor includes one or more of carbon materials including, without limitation, graphite, carbon black, and Ketjen black. Note that the positive electrode conductor may be a metal material or an electrically conductive polymer material as long as the material is electrically conductive.

As illustrated in FIG. 2, the negative electrode 22 includes the negative electrode current collector 22A having two opposed surfaces, and two negative electrode active material layers 22B provided on the respective two opposed surfaces of the negative electrode current collector 22A. Note that the negative electrode active material layer 22B may be disposed only on one of the two opposed surfaces of the negative electrode current collector 22A.

As illustrated in FIG. 4, the negative electrode current collector 22A includes a formation part 22M and the exposed part 22N. The formation part 22M is provided with the negative electrode active material layer 22B. The exposed part 22N is provided with no negative electrode active material layer 22B. The negative electrode active material layer 22B is provided on each of two opposed surfaces of the formation part 22M, as described above. The exposed part 22N is a part that extends to protrude from a portion of the formation part 22M. The exposed part 22N has a width smaller than a width of the formation part 22M. The width refers to a dimension in the X-axis direction. The exposed part 22N is positioned not to overlap with the exposed part 21N. As illustrated by a dash-dot-dot-dash line in FIG. 4, however, the exposed part 22N may have the same width as the formation part 22M. The multiple exposed parts 22N are joined to each other, and the negative electrode lead 42 is coupled to the joined exposed parts 22N.

The negative electrode current collector 22A includes one or more of electrically conductive materials including, without limitation, a metal material. Examples of the metal material include copper, aluminum, nickel, and stainless steel. The negative electrode active material layer 22B includes one or more of negative electrode active materials into which lithium is insertable and from which lithium is extractable. The negative electrode active material layer 22B may further include, for example, a negative electrode binder and a negative electrode conductor. Details of the negative electrode binder are similar to the details of the positive electrode binder. Details of the negative electrode conductor are similar to the details of the positive electrode conductor. A method of forming the negative electrode active material layer 22B is not particularly limited, and specifically, includes one or more of methods including, without limitation, a coating method, a vapor-phase method, a liquid-phase method, a thermal spraying method, and a firing (sintering) method.

The negative electrode active material is not particularly limited in kind, and specific examples thereof include a carbon material and a metal-based material. Examples of the carbon material include graphitizable carbon, non-graphitizable carbon, and graphite. Examples of the graphite include natural graphite and artificial graphite. The metal-based material is a material that includes one or more elements among metal elements and metalloid elements that are each able to form an alloy with lithium. Examples of the metal elements and the metalloid elements include silicon and tin. Note that the metal-based material may be a simple substance, an alloy, a compound, a mixture of two or more thereof, or a material including two or more phases thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_x$ ($0<x\leq2$, preferably $0.2<x<1.4$), $LiSiO$, $SnO_w$ ($0<w\leq2$), $SnSiO_3$, $LiSnO$, and $Mg_2Sn$.

Note that the kind of the negative electrode active material may be, for example, a metal oxide or a polymer material. Specific examples of the metal oxide include a lithium composite oxide, an iron oxide, a ruthenium oxide, and a molybdenum oxide. Examples of the lithium composite oxide include a lithium-titanium composite oxide such as lithium titanate ($Li_4Ti_5O_{12}$). Specific examples of the polymer material include polyacetylene, polyaniline, and polypyrrole.

The separator 23 is an insulating porous film interposed between the positive electrode 21 and the negative electrode 22 as illustrated in FIG. 2, and allows lithium ions to pass therethrough while preventing a contact between the positive electrode 21 and the negative electrode 22. The separator 23 includes one or more of materials including, without limitation, a polymer material and a ceramic material. Specific examples of the polymer material include polyethylene, polypropylene, polytetrafluoroethylene, or a copolymer of two or more thereof. Note that the separator 23 may be single-layered or multi-layered.

The electrolytic solution includes one or more of multi-nitrile compounds. The term "multi-nitrile compound" is a generic term for a compound including two or more nitrile groups, as described above. A reason why the electrolytic solution includes one or more of the multi-nitrile compounds is that: the secondary battery is prevented from swelling easily, because gas generation due to the decomposition reaction of the electrolytic solution caused by the positive electrode 21 upon charging and discharging is further suppressed; and the discharge capacity is prevented from decreasing easily even if charging and discharging are repeated, because the decomposition reaction of the electrolytic solution is further suppressed.

In more detail, the multi-nitrile compound has the following properties: upon first-cycle charging and discharging (stabilization of the secondary battery to be described later), the multi-nitrile compound is hardly decomposed and remains in the electrolytic solution; and upon charging and discharging in second and subsequent cycles, the multi-nitrile compound gradually reacts (is gradually decomposed) while forming a film on the surface of the positive electrode 21. Thus, even if the positive electrode active material comes to have a highly reactive fresh surface due to the positive electrode active material being damaged upon the charging and discharging in the second and subsequent cycles, the film derived from the multi-nitrile compound is formed to cover the fresh surface. This suppresses a decomposition reaction of the electrolytic solution on the fresh surface, and suppresses unnecessary gas generation due to such a decomposition reaction of the electrolytic solution. Examples of the damage of the positive electrode active material include breakage of the positive electrode active material and a crack caused in the positive electrode active material. Thus, the secondary battery is prevented from swelling easily and the discharge capacity is prevented from decreasing easily even if charging and discharging are repeated in the second and subsequent cycles.

The multi-nitrile compound includes two or more nitrile groups and a central group to which the two or more nitrile groups are bonded. The central group is not particularly limited in kind, and may be a chain hydrocarbon group, a cyclic hydrocarbon group, or a group in which one or more kinds of chain hydrocarbon groups and one or more kinds of cyclic hydrocarbon groups are bonded to each other.

Note that the chain hydrocarbon group may have a straight-chain structure or a branched structure having one or more side chains. The cyclic hydrocarbon group may include only one ring or two or more rings. In addition, the chain hydrocarbon group and the cyclic hydrocarbon group may each include one or more unsaturated carbon bonds (>C=C<), and may each be a group into which one or more ether bonds (—O—) are introduced.

Specific examples of the multi-nitrile compound include a dinitrile compound and a trinitrile compound. The dinitrile compound includes two nitrile groups. The trinitrile compound includes three nitrile groups. It goes without saying that the multi-nitrile compound may be a compound including four or more nitrile groups.

Specific examples of the dinitrile compound include succinonitrile (carbon number=2), glutaronitrile (carbon number=3), adiponitrile (carbon number=4), pimelonitrile (carbon number=5), suberonitrile (carbon number=6), and sebaconitrile (carbon number=8). The series of specific examples of the dinitrile compound described above each include a chain saturated hydrocarbon group (an alkylene group) as a central group, and the carbon number described in the parenthesis is carbon number of the alkylene group. Specific examples of the dinitrile compound further include ethylene glycol bis(propionitrile) ether. The ethylene glycol bis(propionitrile) ether includes, as a central group, a chain saturated hydrocarbon group (an alkylene group) in the middle of which two ether bonds are introduced.

Specific examples of the trinitrile compound include 1,3,5-cyclohexanetricarbonitrile and 1,3,6-hexanetricarbonitrile. 1,3,5-cyclohexanetricarbonitrile includes a cyclic saturated hydrocarbon group as a central group. 1,3,6-hexanetricarbonitrile includes a branched saturated hydrocarbon group as a central group.

In particular, the electrolytic solution preferably includes two or more multi-nitrile compounds that differ from each other in kind. A reason for this is that a decomposition speed of the multi-nitrile compound differs mainly depending on carbon number of a central group, i.e., a length of a carbon chain. Such combination use of the two or more multi-nitrile compounds that differ from each other in kind makes it easier to continuously form the film derived from the multi-nitrile compound, as compared with a case where only one kind of multi-nitrile compound is used. Thus, the secondary battery is stably prevented from swelling easily and the discharge capacity is stably prevented from decreasing easily.

Specifically, the multi-nitrile compound preferably includes the dinitrile compound, the trinitrile compound, or both. A reason for this is that this facilitates formation of the film derived from the multi-nitrile compound, thus sufficiently preventing the secondary battery from swelling easily and sufficiently preventing the discharge capacity from decreasing easily.

Although not particularly limited, a content of the multi-nitrile compound in the electrolytic solution is preferably within a range from 0.5 wt % to 3.0 wt % both inclusive, and is more preferably within a range from 1.5 wt % to 2.0 wt % both inclusive, in particular. A reason for this is that this facilitates the formation of the film derived from the multi-nitrile compound, thus further preventing the secondary battery from swelling easily and further preventing the discharge capacity from decreasing easily. Note that in a case of the combination use of the two or more multi-nitrile compounds that differ from each other in kind, the above-described content of the multi-nitrile compound is sum total of contents of the respective multi-nitrile compounds.

Note that as long as the electrolytic solution includes the above-described multi-nitrile compound, the electrolytic solution may further include a solvent and an electrolyte salt.

The solvent includes one or more of non-aqueous solvents (organic solvents). An electrolytic solution including the one or more non-aqueous solvents is a so-called non-aqueous electrolytic solution. Examples of the non-aqueous solvent include esters and ethers. More specific examples of the non-aqueous solvent include a carbonic-acid-ester-based compound, a carboxylic-acid-ester-based compound, and a lactone-based compound. A reason for this is that a dissociation property of the electrolyte salt improves and a high mobility of ions is obtainable.

Specifically, examples of the carbonic-acid-ester-based compound include a cyclic carbonic acid ester and a chain carbonic acid ester. Specific examples of the cyclic carbonic acid ester include ethylene carbonate and propylene carbonate. Specific examples of the chain carbonic acid ester include dimethyl carbonate, diethyl carbonate, and methyl ethyl carbonate.

Examples of the carboxylic-acid-ester-based compound include a carboxylic acid ester. Specific examples of the carboxylic acid ester include ethyl acetate, ethyl propionate, propyl propionate, and ethyl trimethylacetate.

Examples of the lactone-based compound include a lactone. Specific examples of the lactone include γ-butyrolactone and γ-valerolactone. Note that examples of the ethers other than the lactone-based compounds described above may include 1,2-dimethoxyethane, tetrahydrofuran, 1,3-dioxolane, and 1,4-dioxane.

Further, examples of the non-aqueous solvent may include an unsaturated cyclic carbonic acid ester, a halogenated carbonic acid ester, a sulfonic acid ester, a phosphoric acid ester, an acid anhydride, a mononitrile compound, and an isocyanate compound. A reason for this is that chemical stability of the electrolytic solution improves.

Specific examples of the unsaturated cyclic carbonic acid ester include vinylene carbonate (1,3-dioxol-2-one), vinylethylene carbonate (4-vinyl-1,3-dioxolane-2-one), and methylene ethylene carbonate (4-methylene-1,3-dioxolane-2-one). Specific examples of the halogenated carbonic acid ester include fluoroethylene carbonate (4-fluoro-1,3-dioxolane-2-one) and difluoroethylene carbonate (4,5-difluoro-1,3-dioxolane-2-one). Specific examples of the sulfonic acid ester include 1,3-propane sultone and 1,3-propene sultone. Specific examples of the phosphoric acid ester include trimethyl phosphate and triethyl phosphate.

Examples of the acid anhydride include a cyclic dicarboxylic acid anhydride, a cyclic disulfonic acid anhydride, and a cyclic carboxylic acid sulfonic acid anhydride. Specific examples of the cyclic dicarboxylic acid anhydride include succinic anhydride, glutaric anhydride, and maleic anhydride. Specific examples of the cyclic disulfonic acid anhydride include 1,2-ethanedisulfonic anhydride and 1,3-propanedisulfonic anhydride. Specific examples of the cyclic carboxylic acid sulfonic acid anhydride include sulfobenzoic anhydride, sulfopropionic anhydride, and sulfobutyric anhydride.

Specific examples of the mononitrile compound include acetonitrile. Specific examples of the isocyanate compound include hexamethylene diisocyanate.

The electrolyte salt includes one or more of light metal salts including, without limitation, a lithium salt. Specific examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide (LiN(CF$_3$SO$_2$)$_2$), lithium tris(trifluoromethanesulfonyl)methide (LiC(CF$_3$SO$_2$)$_3$), lithium difluoro(oxalato)borate (LiBF$_2$(C$_2$O$_4$)), and lithium bis(oxalato)borate (LiB(C$_2$O$_4$)$_2$).

A content of the electrolyte salt is not particularly limited, and specifically, is within a range from 0.3 mol/kg to 3.0 mol/kg both inclusive with respect to the solvent. A reason for this is that a high ionic conductivity is obtainable.

The positive electrode lead 41 is a positive electrode terminal coupled to the positive electrode 21 (the mutually joined exposed parts 21N), and includes one or more of electrically conductive materials including, without limitation, aluminum. The negative electrode lead 42 is a negative electrode terminal coupled to the negative electrode 22 (the mutually joined exposed parts 22N), and includes one or more of electrically conductive materials including, without limitation, copper, nickel, and stainless steel. A shape of each of the positive electrode lead 41 and the negative electrode lead 42 is not particularly limited, and specifically, includes one or more of shapes including, without limitation, a thin plate shape and a meshed shape.

Here, as illustrated in FIG. 1, the positive electrode lead 41 and the negative electrode lead 42 are led out in respective directions that are common to each other, from inside to outside of the outer package film 30. Note that the positive electrode lead 41 and the negative electrode lead 42 may be led out in respective directions that are different from each other.

The number of the positive electrode leads 41 is one, as illustrated in FIG. 1. The number of the positive electrode leads 41 is, however, not particularly limited, and may be two or more. In particular, if the number of the positive electrode leads 41 is two or more, the secondary battery decreases in electrical resistance. The description given here in relation to the number of the positive electrode leads 41 also applies to the number of the negative electrode leads 42. Accordingly, the number of the negative electrode leads 42 may be two or more, without being limited to one.

Figure 5:
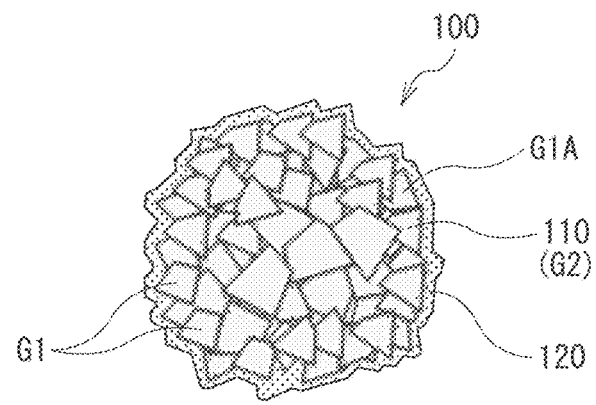
FIG. 5 is a schematic plan view of a configuration of a positive electrode active material.

FIG. 5 schematically illustrates a plan configuration of a positive electrode active material 100, in which the surface of the lithium-nickel composite oxide is covered with the boron compound, as described above. Thus, as illustrated in FIG. 5, the positive electrode active material 100 includes a center part 110 and a covering part 120.

The center part 110 is in a form of particles, and includes the lithium-nickel composite oxide. The covering part 120 covers the surface of the center part 110, and includes the boron compound. The covering part 120 covers the entire surface of the center part 110 as illustrated in FIG. 5. However, the covering part 120 may cover only a portion of the surface of the center part 110. In this case, the covering part 120 may cover the surface of the center part 110 at locations separated from each other.

In the positive electrode active material 100, primary particles G1 each including the lithium-nickel composite oxide are aggregated with each other, and such primary particles G1 form a secondary particle G2 (the center part 110). Accordingly, the boron compound (the covering part 120) covers a surface of the secondary particle G2. Note that the boron compound is considered to be partially mixed in the primary particles G1 in a solid solution state.

Here, the positive electrode active material 100, i.e., the center part 110 (the lithium-nickel composite oxide) having the surface covered with the covering part 120 (the boron compound), has the predetermined physical property to improve the performance of the secondary battery 10 as described above.

Specifically, the positive electrode active material 100 has a crystallite size Z (nm) of a (104) plane that is within a range from 40.0 nm to 74.5 nm both inclusive. The crystallite size Z (nm) is calculated by X-ray diffractometry (XRD) and Scherrer equation.

In addition, the positive electrode active material 100 has an element concentration ratio R represented by Expression (2) below that is within a range from 0.15 to 0.90 both inclusive. The element concentration ratio R is calculated on the basis of a boron (B) 1s spectrum, a nickel (Ni) $2p_{3/2}$ spectrum, a cobalt (Co) $2p_{3/2}$ spectrum, a manganese (Mn) $2p_{1/2}$ spectrum, and an aluminum (Al) 2s spectrum of the positive electrode active material 100 detected by X-ray photoelectron spectroscopy (XPS). The element concentration ratio R is a parameter representing a boron distribution state at the surface of the positive electrode active material 100.

$$R = I2/I1 \tag{2}$$

where:
R is the element concentration ratio;
I1 is sum total of a Ni concentration in atomic percent, a Co concentration in atomic percent, a Mn concentration in atomic percent, and an Al concentration in atomic percent that are calculated on the basis of the Ni$2p_{3/2}$ spectrum, the Co$2p_{3/2}$ spectrum, the Mn$2p_{1/2}$ spectrum, and the Al2s spectrum, respectively; and
I2 is a B concentration in atomic percent calculated on the basis of the B1s spectrum.

As described above, the positive electrode active material includes the lithium-nickel composite oxide and the boron compound. More specifically, the positive electrode active material 100 includes the center part 110 (the lithium-nickel composite oxide) and the covering part 120 (the boron compound).

In this case, a reason why the above-described two conditions related to the crystallite size Z and the element concentration ratio R are both satisfied is that the element concentration ratio R is made appropriate in relation to the crystallite size Z, and therefore, the surface state of the positive electrode active material 100 (respective distributions of boron and a residual lithium component) is made appropriate. The residual lithium component is a lithium reaction product such as lithium carbonate (Li$_2$CO$_3$). Thus, the surface of the center part 110 is sufficiently protected by the covering part 120 while the remaining amount of the residual lithium component is sufficiently reduced on the surface of the positive electrode active material 100.

Accordingly, insertion and extraction of the lithium ions are facilitated at the center part 110 and the decomposition reaction of the electrolytic solution is suppressed on the surface of the center part 110 while gas generation due to the presence of the residual lithium component is suppressed. In this case, the decomposition reaction of the electrolytic solution is suppressed effectively even if the secondary battery 10 (the positive electrode active material 100) is used (charged and discharged) or stored in a high temperature environment in particular.

Based upon the above, in the positive electrode 21, because not only the gas generation due to the decomposition reaction of the electrolytic solution is suppressed but also gas generation due to the presence of the residual lithium component is suppressed, a gas generation amount reduces markedly. Accordingly, the secondary battery is markedly prevented from swelling easily upon charging and discharging and the discharge capacity is prevented from decreasing easily even if charging and discharging are repeated, while a high energy density is maintained.

In particular, the crystallite size Z is preferably within a range from 50.0 nm to 70.0 nm both inclusive, and the element concentration ratio R is preferably within a range from 0.30 to 0.60 both inclusive. A reason for this is that the gas generation amount further reduces, and accordingly, the secondary battery is further prevented from swelling easily upon charging and discharging and the discharge capacity is further prevented from decreasing easily even if charging and discharging are repeated.

The crystallite size Z is a parameter calculated on the basis of an analysis result on the positive electrode active material 100 obtained by XRD. As described above, the crystallite size Z is calculated by Scherrer equation represented by Expression (3) below.

$$Z = K\lambda / B \cos \theta \quad (3)$$

where:
K is a Scherrer constant;
$\lambda$ is a wavelength (nm) of X-rays;
B is a full width at half maximum (°) depending on the crystallite size Z; and
$\theta$ is a Bragg angle, i.e. a value (°) of half the diffraction angle $2\theta$.

In a case of analyzing the positive electrode active material 100 by XRD, a fully automated multipurpose X-ray diffractometer SmartLab manufactured by Rigaku Corporation may be used. In this case, the conditions are as follows.
Goniometer: SmartLab,
attachment: standard $\chi$ cradle,
monochromator: Bent,
scanning mode: $2\theta/\theta$,
scanning type: FT,
X-ray: CuK$\alpha$ ray,
irradiation intensity: 45 kV/200 mA,
incident slit: ½ deg,
light receiving slit 1: ½ deg,
light receiving slit 2: 0.300 mm,
start: 15,
stop: 90, and
step: 0.02.

Thus, in the Scherrer equation represented by Expression (3), K is set to 0.89, $\lambda$ (the wavelength of the CuK$\alpha$ ray) is set to 0.15418 nm, and B is set to the full width at half maximum.

In a case of analyzing the positive electrode active material 100 by XPS, an X-ray photoelectron spectrometer Quantera SXM manufactured by ULVAC-PHI, Inc. may be used. The analysis result obtained by XPS (regarding the B1s spectrum, the $Ni2p_{3/2}$ spectrum, the $Co2p_{3/2}$ spectrum, the $Mn2p_{1/2}$ spectrum, and the Al2s spectrum) includes peak intensities of the series of spectra measured automatically. Thus, the B concentration, the Ni concentration, the Co concentration, the Mn concentration, and the Al concentration are calculated (by conversion) on the basis of a result of the measurement. The element concentration ratio R is calculated thereby. Note that an analyzable range in a case of using XPS is a narrow range in the vicinity of the surface of the positive electrode active material 100.

Upon charging the secondary battery 10, lithium is extracted from the positive electrode 21, and the extracted lithium is inserted into the negative electrode 22 via the electrolytic solution. Upon discharging the secondary battery 10, lithium is extracted from the negative electrode 22, and the extracted lithium is inserted into the positive electrode 21 via the electrolytic solution. Upon charging and discharging, lithium is inserted and extracted in an ionic state.

A method of manufacturing the positive electrode active material 100 is described with reference to FIG. 5, and then a method of manufacturing the secondary battery 10 using the positive electrode active material 100 is described with reference to FIGS. 1 to 4.

Here, a description is given of the method of manufacturing the positive electrode active material 100 including the center part 110 and the covering part 120. In a case of manufacturing the positive electrode active material 100, a precursor fabrication process, a first firing process, a water washing process, and a covering process (a second firing process) are performed in this order as will be described below.

First, as raw materials, a lithium source (a lithium compound), a nickel source (a nickel compound), and on an as-needed basis, a source of the additional metal element (M in Formula (1)) (an additional compound) are prepared. A case of using the additional compound (the additional metal element) will be described below. The lithium compound may be an inorganic compound or an organic compound. Only one lithium compound may be used, or two or more lithium compounds may be used. The above description related to the lithium compound is similarly applicable to each of the nickel compound and the additional compound.

Specific examples of the lithium compound as the inorganic compound include lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogen sulfide, lithium sulfate, lithium hydrogen sulfate, lithium nitride, lithium azide, lithium nitrite, lithium phosphate, lithium dihydrogen phosphate, and lithium bicarbonate. Specific examples of the lithium compound as the organic compound include methyllithium, vinyllithium, isopropyllithium, butyllithium, phenyllithium, lithium oxalate, and lithium acetate.

Thereafter, the nickel compound and the additional compound are dissolved with use of an aqueous solvent such as pure water, following which a coprecipitate (a nickel composite coprecipitated hydroxide) is obtained by a coprecipitation method. In this case, a mixture ratio between the nickel compound and the additional compound is adjusted in accordance with a composition of the center part 110 (the lithium-nickel composite oxide) to be finally obtained. As an alkali compound for coprecipitation, one or more of hydroxides including, without limitation, sodium hydroxide (NaOH) and ammonium hydroxide ($NH_4OH$) are used. Thereafter, the nickel composite coprecipitated hydroxide is washed with water, following which the washed nickel composite coprecipitated hydroxide is dried.

Lastly, the lithium compound, the nickel composite coprecipitated hydroxide, and the additional compound are mixed with each other to obtain a precursor. In this case, a mixture ratio between the nickel compound, the nickel composite coprecipitated hydroxide, and the additional compound is adjusted in accordance with the composition of the center part 110 (the lithium-nickel composite oxide) to be finally obtained.

The precursor is fired. This results in formation of a compound (a lithium-nickel composite oxide) including lithium, nickel, and the additional metal element as constituent elements. As a result, the center part 110 including the lithium-nickel composite oxide is obtained. In the lithium-nickel composite oxide obtained here, most of the primary particles G1 are aggregated, and most of such primary particles G1 form the secondary particle G2.

Conditions including, without limitation, a firing temperature are not particularly limited, and may be set as desired. The firing temperature is preferably within a range from 650° C. to 850° C. both inclusive in particular. A reason for this is that a lithium-nickel composite oxide having a stable composition is manufactured more easily with superior reproducibility.

In detail, if the firing temperature is lower than 650° C., it is more difficult for the lithium compound to be diffused, and it is more difficult for an R3m layered rock-salt crystal structure to be formed sufficiently. In contrast, if the firing temperature is higher than 850° C., lithium deficiency occurs more easily in the crystal structure of the lithium-nickel composite oxide due to volatilization of the lithium compound. Further, another atom enters the lithium deficient site (vacant site), which causes the lithium-nickel composite oxide to have a non-stoichiometric composition more easily. Examples of the other atom include nickel ($Ni^{2+}$) having an ion radius almost the same as the ion radius of lithium ($Li^+$).

In a case where nickel is mixed into the lithium 3d site, a region with the nickel mixed therein becomes a cubic salt phase (a rock-salt domain). The rock-salt domain is electrochemically inert, and the nickel mixed into the lithium site has a property of easily preventing solid-phase diffusion of a phase of only lithium. This easily induces degradation of the performance, including an electrical resistance characteristic, of the secondary battery 10.

Note that in order to suppress occurrence of an unnecessary reduction reaction upon firing the precursor, it is preferable to fire the precursor in an oxygen atmosphere. Examples of the above-mentioned reduction reaction include a reduction reaction of nickel ($Ni^{3+} \rightarrow Ni^{2+}$).

In particular, in the first firing process described above, the crystallite size Z is controllable by adjusting the firing temperature.

The center part 110 (the lithium-nickel composite oxide) is washed with use of an aqueous solvent such as pure water. In this case, the center part 110 may be mechanically washed with use of an apparatus such as a stirring apparatus on an as-needed basis. Conditions including, without limitation, a washing time are not particularly limited, and may be set as desired.

The center part 110 (the lithium-nickel composite oxide) and the boron compound are mixed with each other to thereby obtain a mixture, following which the mixture is fired. In this case, a mixture ratio between the center part 110 and the boron compound is adjusted in such a manner that the abundance of boron on the surface of the center part 110, i.e., the amount of boron covering the surface of the center part 110, has a desired value. The boron compound is thus fixed on the surface of the center part 110 to cover the surface of the center part 110. As a result, the covering part 120 including the boron compound is formed. Accordingly, the positive electrode active material 100 including the center part 110 (the lithium-nickel composite oxide) and the covering part 120 (the boron compound) is obtained.

In particular, in the covering process (the second firing process) described above, the element concentration ratio R is controllable, i.e., the boron-compound covering state of the surface of the lithium-nickel composite oxide is controllable, by adjusting the amount of the added boron compound.

In a case of manufacturing the secondary battery 10, as will be described below, the positive electrode 21 and the negative electrode 22 are fabricated and the electrolytic solution is prepared, following which the secondary battery is fabricated using the positive electrode 21, the negative electrode 22, and the electrolytic solution.

First, the positive electrode active material 100 and materials including, without limitation, the positive electrode binder and the positive electrode conductor are mixed with each other to thereby obtain a positive electrode mixture. Thereafter, the positive electrode mixture is dispersed in a dispersion solvent to thereby prepare a paste positive electrode mixture slurry. The dispersion solvent is not particularly limited in kind, and includes one or more of organic solvents including, without limitation, N-methyl-2-pyrrolidone. Thereafter, the positive electrode mixture slurry is applied on the two opposed surfaces of the positive electrode current collector 21A (the formation part 21M) to thereby form the positive electrode active material layers 21B. Lastly, the positive electrode active material layers 21B are compression-molded by means of a roll pressing machine. Thus, the positive electrode active material layers 21B are formed on the respective two opposed surfaces of the positive electrode current collector 21A. As a result, the positive electrode 21 is fabricated.

First, the negative electrode active material and materials including, without limitation, the negative electrode binder and the negative electrode conductor are mixed with each other to thereby obtain a negative electrode mixture. Thereafter, the negative electrode mixture is dispersed in a dispersion solvent to thereby prepare a paste negative electrode mixture slurry. The dispersion solvent is not particularly limited in kind, and includes one or more of organic solvents including, without limitation, N-methyl-2-pyrrolidone and methyl ethyl ketone. Thereafter, the negative electrode mixture slurry is applied on the two opposed surfaces of the negative electrode current collector 22A (the formation part 22M) to thereby form the negative electrode active material layers 22B. Lastly, the negative electrode active material layers 22B are compression-molded by means of a roll pressing machine. Thus, the negative electrode active material layers 22B are formed on the respective two opposed surfaces of the negative electrode current collector 22A. As a result, the negative electrode 22 is fabricated.

The electrolyte salt is added to the solvent, following which the multi-nitrile compound is added to the solvent. The electrolyte salt and the multi-nitrile compound are each thus dispersed or dissolved in the solvent. As a result, the electrolytic solution is prepared.

First, the positive electrode 21 and the negative electrode 22 are alternately stacked with the separator 23 interposed therebetween to thereby form a stacked body. The stacked body has a configuration similar to that of the battery device 20 except that the positive electrode 21, the negative electrode 22, and the separator 23 are each not impregnated with the electrolytic solution. Thereafter, the exposed parts 21N are joined to each other, following which the positive electrode lead 41 is coupled to the mutually joined exposed parts 21N. Further, the exposed parts 22N are joined to each other, following which the negative electrode lead 42 is coupled to the mutually joined exposed parts 22N. A joining method and a coupling method are each not particularly limited, and each include one or more of methods including, without limitation, ultrasonic welding, resistance welding, and soldering.

Thereafter, the stacked body is placed inside the depression part 31, following which the film members 30A and 30B are overlaid on each other with the stacked body interposed therebetween. Thereafter, outer edges of three sides other than an outer edge of one side of the film member 30A and corresponding outer edges of the three sides other than an outer edge of the one side of the film member 30B are adhered to each other, to thereby contain the stacked body in the outer package film 30 having a pouch shape. A method of adhering the film members 30A and 30B to each other is not particularly limited. Therefore, the film members 30A and 30B may be adhered to each other by a thermal-fusion-bonding method or with use of an adhesive.

Lastly, the electrolytic solution is injected into the outer package film 30 having the pouch shape, following which the outer edge of the remaining one side of the film member 30A and the outer edge of the remaining one side of the film member 30B are bonded to each other, to thereby seal the outer package film 30. In this case, a sealing film 33 is interposed between the outer package film 30 (the film members 30A and 30B) and the positive electrode lead 41, and a sealing film 34 is interposed between the outer package film 30 and the negative electrode lead 42. The stacked body is thereby impregnated with the electrolytic solution. Thus, the battery device 20 which is the stacked electrode body is fabricated, and the battery device 20 is contained inside the outer package film 30 while the positive electrode lead 41 and the negative electrode lead 42 are led out from inside to outside of the outer package film 30. In this manner, the battery device 20 is sealed in the outer package film 30. As a result, the secondary battery 10 is assembled.

The assembled secondary battery 10 is charged and discharged. Various conditions including, without limitation, an environment temperature, the number of times of charging and discharging (i.e., the number of cycles), and charging and discharging conditions may be set as desired. A film is thereby formed on a surface of each of the positive electrode 21 and the negative electrode 22. This allows the secondary battery to be in an electrochemically stable state. As a result, the secondary battery using the outer package film 30, i.e., the secondary battery of the laminated-film type is completed.

In the secondary battery 10, the positive electrode active material of the positive electrode 21 includes the lithium-nickel composite oxide and the boron compound, and the electrolytic solution includes the multi-nitrile compound. In addition, the crystallite size Z of the (104) plane of the positive electrode active material is within a range from 40.0 nm to 74.5 nm both inclusive, and the element concentration ratio R of the positive electrode active material is within a range from 0.15 to 0.90 both inclusive.

Thus, as described above, because the decomposition reaction of the electrolytic solution due to the positive electrode 21 is suppressed, the secondary battery is prevented from swelling easily upon charging and discharging and the discharge capacity is prevented from decreasing easily even if charging and discharging are repeated, while a high energy density is maintained. In this case, because the film derived from the multi-nitrile compound is formed continuously upon charging and discharging also in the second and subsequent cycles, the decomposition reaction of the electrolytic solution is continuously suppressed. In addition, because not only the gas generation due to the decomposition reaction of the electrolytic solution is suppressed but also the gas generation due to the presence of the residual lithium component is suppressed, the gas generation amount reduces markedly. Accordingly, the secondary battery is prevented from swelling easily upon charging and discharging and the discharge capacity is prevented from decreasing easily even if charging and discharging are repeated, while the battery capacity is secured. As a result, it is possible to obtain a superior capacity characteristic, a superior swelling characteristic, and superior cyclability.

In particular, the positive electrode active material 100 may include the center part 110 (the lithium-nickel composite oxide) and the covering part 120 (the boron compound). This makes it easier for the surface of the lithium-nickel composite oxide to be electrochemically stable. Thus, it is easier to suppress the decomposition reaction of the electrolytic solution on the surface of the lithium-nickel composite oxide. Accordingly, it is possible to achieve higher effects.

In addition, b in Formula (1) may satisfy $0.1 \leq b \leq 0.2$, and $1-b$ may therefore satisfy $0.8 \leq 1-b \leq 0.9$. This further suppresses the decomposition reaction of the electrolytic solution due to the positive electrode 21 upon charging and discharging while maintaining a high energy density. Accordingly, it is possible to achieve higher effects.

In addition, the multi-nitrile compound may include the dinitrile compound such as succinonitrile, the trinitrile compound such as ethylene glycol bis(propionitrile) ether, or both. This facilitates formation of the film derived from the multi-nitrile compound. Accordingly, it is possible to achieve higher effects.

In addition, the crystallite size Z may be within a range from 50.0 nm and to 70.0 nm both inclusive or the element concentration ratio R may be within a range from 0.30 to 0.60 both inclusive. This further reduces the gas generation amount. Accordingly, it is possible to achieve higher effects.

In addition, the content of the multi-nitrile compound in the electrolytic solution may be within a range from 0.5 wt % to 3.0 wt % both inclusive, and may preferably be within a range from 1.5 wt % to 2.0 wt % both inclusive. This further facilitates the formation of the film derived from the multi-nitrile compound. Accordingly, it is possible to achieve higher effects.

In addition, the secondary battery may include the outer package film 30 having flexibility and the battery device 20 (the positive electrode 11, the negative electrode 12, and the electrolytic solution) may be contained inside the outer package film 30. This efficiently prevents the secondary battery from swelling easily even with the use of the outer package film 30 which easily causes noticeable swelling. Accordingly, it is possible to achieve higher effects.

In addition, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery 10 described above is appropriately modifiable as described below. Note that any two or more of the following series of modifications may be combined with each other.

Figure 6:
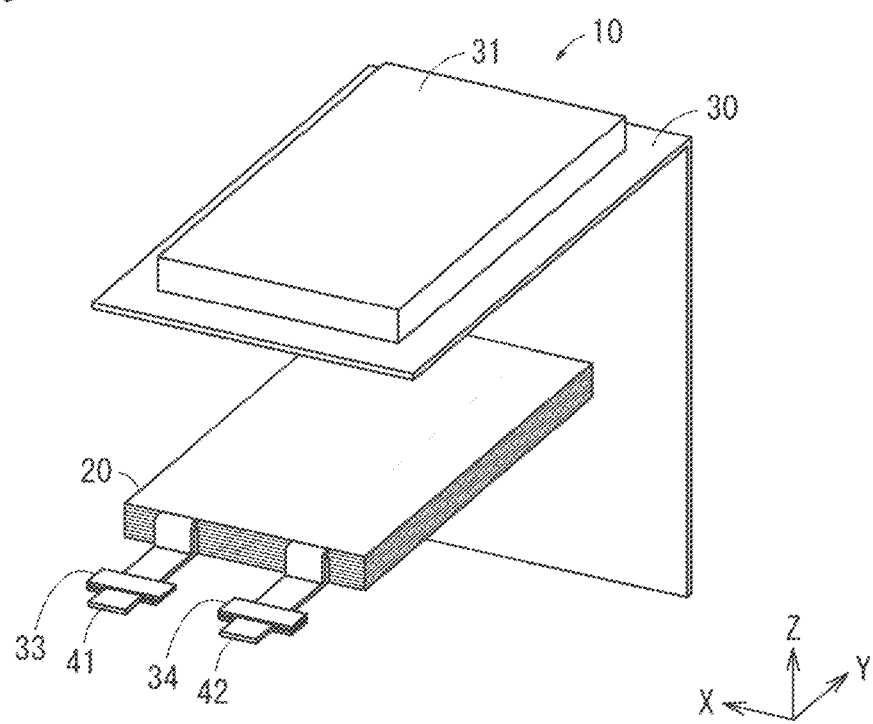
FIG. 6 is a perspective view of a configuration of a secondary battery.

As illustrated in FIG. 1, the two pieces of outer package film 30, i.e., the film members 30A and 30B, are used. However, as illustrated in FIG. 6 corresponding to FIG. 1, a single piece of outer package film 30 which is foldable may be used instead of the two pieces of outer package film 30. The single piece of outer package film 30 has, for example, a structure in which one side of the film member 30A and one side of the film member 30B opposed to the one side of the film member 30A are coupled to each other.

In this case, the single piece of outer package film 30 is folded, following which mutually-opposed outer edges of three sides of the outer package film 30 are adhered to each other, to thereby seal the battery device 20 inside the outer package film 30 having the pouch shape. In this case also, the battery device 20 is contained inside the outer package film 30, and similar effects are therefore obtainable.

The separator 23 which is a porous film is used. However, although not specifically illustrated here, a separator of a stacked type including a polymer compound layer may be used instead of the separator 23 which is the porous film.

Specifically, the separator of the stacked type includes the porous film having two opposed surfaces, and a polymer compound layer disposed on one of or each of the two opposed surfaces of the porous film. A reason for this is that adherence of the separator to each of the positive electrode 21 and the negative electrode 22 improves to suppress the occurrence of misalignment of the battery device 20. This prevents the secondary battery from swelling easily even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that such insulating particles dissipate heat upon heat generation by the secondary battery, thus improving safety or heat resistance of the secondary battery. Examples of the insulating particles include inorganic particles and resin particles. Specific examples of the inorganic particles include particles of aluminum oxide, aluminum nitride, boehmite, silicon oxide, titanium oxide, magnesium oxide, and zirconium oxide. Specific examples of the resin particles include particles of acrylic resin and styrene resin.

In a case of fabricating the separator of the stacked type, a precursor solution including, without limitation, the polymer compound and an organic solvent is prepared, following which the precursor solution is applied on one of or each of the two opposed surfaces of the porous film. In another example, the porous film may be immersed in the precursor solution. In this case, insulating particles may be added to the precursor solution on an as-needed basis.

In the case where the separator of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one of or each of the two opposed surfaces of the positive electrode 21 and on one of or each of the two opposed surfaces of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the above-described secondary battery.

The applications of the secondary battery are not particularly limited and can include, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency.

In particular, the secondary battery is effectively applied to an electronic apparatus, a battery pack, an electric vehicle, an electric power storage system, an electric power tool, etc. The battery pack may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some specific application examples of the secondary battery will now be described. The configurations of the application examples described below are merely examples, and are appropriately modifiable.

Figure 7:
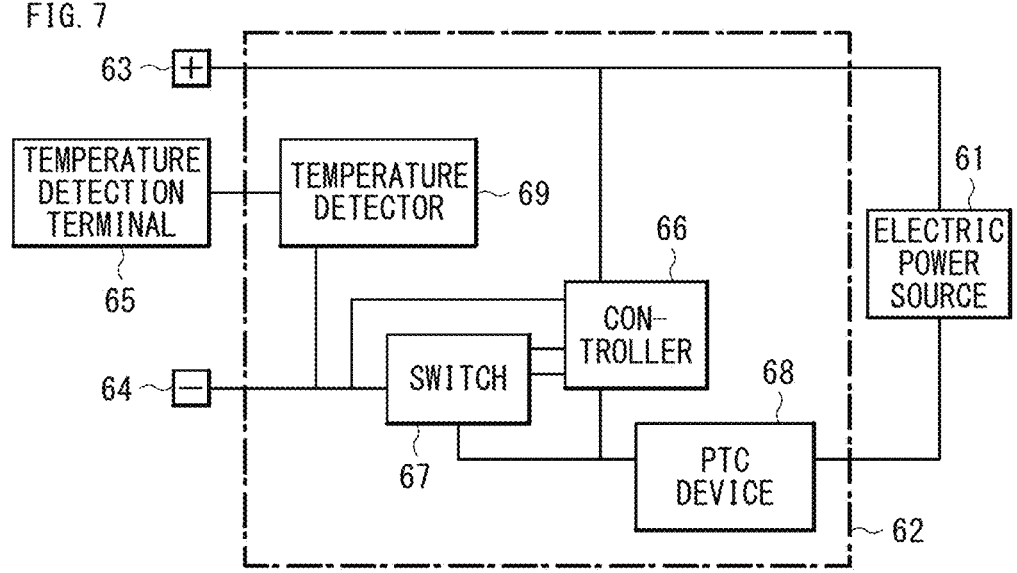
FIG. 7 is a block diagram illustrating a configuration of an application example of the secondary battery.

FIG. 7 illustrates a block configuration of a battery pack. The battery pack described here is a simple battery pack (a so-called soft pack) including one secondary battery, and is to be mounted on, for example, electronic equipment typified by a smartphone.

As illustrated in FIG. 7, the battery pack includes an electric power source 61 and a circuit board 62. The circuit board 62 is coupled to the electric power source 61, and includes a positive electrode terminal 63, a negative electrode terminal 64, and a temperature detection terminal 65. The temperature detection terminal 65 is a so-called T terminal.

The electric power source 61 includes one secondary battery. The secondary battery has a positive electrode lead coupled to the positive electrode terminal 63 and a negative electrode lead coupled to the negative electrode terminal 64. The electric power source 61 is couplable to outside via the positive electrode terminal 63 and the negative electrode terminal 64, and is thus chargeable and dischargeable. The circuit board 62 includes a controller 66, a switch 67, a thermosensitive resistive device (a positive temperature coefficient (PTC) device) 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 on an as-needed basis.

If a battery voltage of the electric power source 61 (the secondary battery) reaches an overcharge detection voltage or an overdischarge detection voltage, the controller 66 turns off the switch 67. This prevents a charging current from flowing into a current path of the electric power source 61. In addition, if a large current flows upon charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charging diode, and a discharging diode. The switch 67 performs switching between coupling and decoupling between the electric power source 61 and external equipment in accordance with an instruction from the controller 66. The switch 67 includes, for example, a metal-oxide-semiconductor field-effect transistor (MOSFET). The charging and discharging currents are detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charge/discharge control upon abnormal heat generation or in a case where the controller 66 performs a correction process upon calculating a remaining capacity.

EXAMPLES

A description is given of Examples of the present technology according to an embodiment.

Experiment Examples 1 to 24

The positive electrode active materials 100 illustrated in FIG. 5 were synthesized and the secondary batteries 10 (the lithium-ion secondary batteries) of the laminated-film type illustrated in FIGS. 1 to 4 were each fabricated, following which the secondary batteries 10 were each evaluated for performance.

[Synthesis of Positive Electrode Active Material]

The positive electrode active material 100 was synthesized by the following procedure.

In the precursor fabrication process, first, the nickel compound (nickel sulfate ($NiSO_4$)) and the additional compound (cobalt sulfate ($CoSO_4$)) were put into an aqueous solvent (pure water), following which the aqueous solvent was stirred to thereby obtain a mixture aqueous solution. In this case, a mixture ratio between the nickel compound and the cobalt compound, i.e., a molar ratio between nickel and cobalt, was adjusted in such a manner that the lithium-nickel composite oxide to be finally obtained had a composition listed in Tables 1 and 2.

Thereafter, the alkali compound (sodium hydroxide (NaOH) and ammonium hydroxide ($NH_4OH$)) was added to the mixture aqueous solution while the mixture aqueous solution was stirred, to thereby obtain a precipitate in a form of particles (secondary particles G2 of a nickel-cobalt composite coprecipitated hydroxide) by a coprecipitation method.

Thereafter, the nickel-cobalt composite coprecipitated hydroxide was washed with use of an aqueous solvent (pure water), following which the washed nickel-cobalt composite coprecipitated hydroxide was dried.

Lastly, the lithium compound (lithium hydroxide monohydrate ($LiOH \cdot H_2O$)) and the additional compound (aluminum hydroxide ($Al(OH)_3$)) were added to the nickel-cobalt composite coprecipitated hydroxide, to thereby obtain a precursor. In this case, a mixture ratio between the nickel-cobalt composite coprecipitated hydroxide, the lithium compound, and the additional compound, i.e., a molar ratio between lithium, nickel, cobalt, and aluminum, was adjusted in such a manner that the lithium-nickel composite oxide to be finally obtained had the composition listed in Tables 1 and 2.

In the first firing process, the precursor was fired in an oxygen atmosphere. In this case, the firing temperature was adjusted within a range from 650° C. to 900° C. both inclusive. A lithium-nickel composite oxide in a form of particles was thereby synthesized. As a result, the center part 110 including the lithium-nickel composite oxide was obtained. The synthesized lithium-nickel composite oxide had the composition listed in Tables 1 and 2.

In the water washing process, first, 50 g of the center part 110 and 500 ml (=500 $cm^3$) of an aqueous solvent (pure water) were put into a beaker having a volume of 1000 ml (=1000 $cm^3$). Thereafter, the aqueous solvent was stirred with use of a stirring apparatus to thereby wash the center part 110 with use of the aqueous solvent. In this case, the washing time was adjusted within a range from 60 minutes to 150 minutes both inclusive. Thereafter, the aqueous solvent was transferred into a suction filter, following which the filtrate was dehydrated (for a dehydration time of 10 minutes). Thereafter, the filtrate was dried (at a drying temperature of 120° C.). Thereafter, the filtrate was pulverized with use of an agate mortar, following which the pulverized material was dried in a vacuum (for a drying time of 100° C.). In this manner, the washed center part 110 was obtained.

In the covering process (the second firing process), the center part 110 and the boron compound (boric acid ($H_3BO_3$)) were mixed with each other to thereby obtain a mixture. In this case, the mixing amount of the boron compound, i.e., a ratio of a mass of the boron compound to a mass of the center part 110, was adjusted within a range from 0.05 mass % to 0.55 mass % both inclusive. Thereafter, the mixture was fired in an oxygen atmosphere. In this case, the firing temperature was adjusted within a range from 200° C. to 450° C. both inclusive. The surface of the center part 110 (the lithium-nickel composite oxide) was thereby covered with the covering part 120 (the boron compound), as illustrated in FIG. 5. In this manner, the positive electrode active material 100 was obtained.

The positive electrode active material 100 was analyzed by XRD, following which the crystallite size Z (nm) was calculated by the Scherrer equation on the basis of an analysis result (a(104) plane peak). This revealed the results given in Tables 1 and 2. Further, after analyzing the positive electrode active material 100 by XPS, the element concentration ratio R was calculated on the basis of the analysis result. This revealed the results given in Tables 1 and 2.

Note that in a case of synthesizing the positive electrode active material 100, the crystallite size Z was changed by changing the firing temperature in the first firing process, and the element concentration ratio R was changed by adjusting the mixture ratio of the boron compound in the covering process (the second firing process), as described in Tables 1 and 2.

[Table 1]

TABLE 1

| | Positive electrode active material | | | | Multi-nitrile Compound | | Battery | | Capacity |
|---|---|---|---|---|---|---|---|---|---|
| Experiment example | Center part (Lithium-nickel composite oxide) | Covering part (Boron compound) | Crystallite size Z (nm) | Element concentration ratio R | Kind | Content (wt %) | capacity (Normalized) | Swelling rate (%) | retention rate (%) |
| 1 | $LiNi_{0.46}Co_{0.20}Al_{0.34}O_2$ | $H_3BO_3$ | 52.0 | 0.4 | SN | 1.5 | 65 | 3 | 93 |
| 2 | $LiNi_{0.50}Co_{0.20}Al_{0.30}O_2$ | | | | | | 70 | 2 | 95 |
| 3 | $LiNi_{0.60}Co_{0.20}Al_{0.20}O_2$ | | | | | | 75 | 3 | 92 |
| 4 | $LiNi_{0.80}Co_{0.15}Al_{0.05}O_2$ | | | | | | 100 | 3 | 85 |
| 5 | $LiNi_{0.90}Co_{0.07}Al_{0.03}O_2$ | | | | | | 110 | 8 | 72 |
| 6 | $LiNi_{0.92}Co_{0.05}Al_{0.03}O_2$ | | | | | | 115 | 15 | 60 |
| 7 | $LiNi_{0.80}Co_{0.15}Al_{0.05}O_2$ | $H_3BO_3$ | 38.0 | 0.4 | SN | 1.5 | 100 | 17 | 94 |
| 8 | | | 40.0 | | | | 100 | 11 | 89 |
| 9 | | | 50.0 | | | | 100 | 5 | 88 |
| 10 | | | 60.0 | | | | 100 | 4 | 86 |
| 11 | | | 70.0 | | | | 100 | 3 | 84 |
| 12 | | | 74.5 | | | | 100 | 2 | 81 |
| 13 | | | 76.0 | | | | 100 | 2 | 70 |

[Table 2]

TABLE 2

| | Positive electrode active material | | | | Multi-nitrile compound | | Battery | | Capacity |
|---|---|---|---|---|---|---|---|---|---|
| Experiment example | Center part (Lithium-nickel composite oxide) | Covering part (Boron compound) | Crystallite size Z (nm) | Element concentration ratio R | Kind | Content (wt %) | capacity (Normalized) | Swelling rate (%) | retention rate (%) |
| 14 | $LiNi_{0.80}Co_{0.15}Al_{0.05}O_2$ | $H_3BO_3$ | 52.0 | 0.10 | SN | 1.5 | 105 | 20 | 81 |
| 15 | | | | 0.15 | | | 103 | 15 | 82 |
| 16 | | | | 0.30 | | | 97 | 7 | 85 |
| 17 | | | | 0.60 | | | 97 | 5 | 86 |
| 18 | | | | 0.90 | | | 94 | 4 | 82 |
| 19 | | | | 1.00 | | | 92 | 4 | 74 |
| 20 | $Li_{0.75}Ni_{0.80}Co_{0.15}Al_{0.05}O_{1.87}$ | $H_3BO_3$ | 52.0 | 0.4 | SN | 1.5 | 35 | 15 | 47 |
| 21 | $Li_{0.85}Ni_{0.80}Co_{0.15}Al_{0.05}O_{1.92}$ | | | | | | 78 | 7 | 71 |
| 22 | $Li_{1.15}Ni_{0.80}Co_{0.15}Al_{0.05}O_{2.08}$ | | | | | | 81 | 13 | 72 |
| 23 | $Li_{1.25}Ni_{0.80}Co_{0.15}Al_{0.05}O_{2.13}$ | | | | | | 75 | 36 | 42 |
| 24 | $LiNi_{0.80}Co_{0.15}Al_{0.05}O_2$ | $H_3BO_3$ | 52.0 | 0.4 | — | — | 100 | 20 | 75 |

[Fabrication of Secondary Battery]

The secondary batteries 10 of the laminated-film type were fabricated by the following procedure.

(Process of Fabricating Positive Electrode)

First, 95.5 parts by mass of the above-described positive electrode active material 100 (the center part 110 and the covering part 120), 1.9 parts by mass of the positive electrode binder (polyvinylidene difluoride), 2.5 parts by mass of the positive electrode conductor (carbon black), and 0.1 parts by mass of a dispersant (polyvinylpyrrolidone) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the formation part 21M of the positive electrode current collector 21A (an aluminum foil having a thickness of 15 μm) by means of a coating apparatus, following which the applied positive electrode mixture slurry was dried to thereby form the positive electrode active material layers 21B. Lastly, the positive electrode active material layers 21B were compression-molded by means of a roll pressing machine. The positive electrode active material layers 21B were thus formed on the respective two opposed surfaces of the positive electrode current collector 21A. In this manner, the positive electrode 21 was fabricated.

(Process of Fabricating Negative Electrode)

First, 90 parts by mass of the negative electrode active material (graphite) and 10 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on the two opposed surfaces of the formation part 22M of the negative electrode current collector 22A (a copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of a roll pressing machine. The negative electrode active material layers 22B were thus formed on the respective two opposed surfaces of the negative electrode current collector 22A. In this manner, the negative electrode 22 was fabricated.

(Process of Preparing Electrolytic Solution)

The electrolyte salt (lithium hexafluorophosphate) was added to a solvent (ethylene carbonate and ethyl methyl carbonate) and the solvent was stirred, following which the multi-nitrile compound (succinonitrile (SN) which is the dinitrile compound) was added to the stirred solvent and the solvent was stirred. In this case, a mixture ratio (a mass ratio) between ethylene carbonate and ethyl methyl carbonate in the solvent was set to 50:50, and a content of the electrolyte salt with respect to the solvent was set to 1 mol/kg. A content (wt %) of the multi-nitrile compound in the electrolytic solution was as listed in Tables 1 and 2. Thus, the electrolyte salt and the multi-nitrile compound were each dispersed or dissolved in the solvent. In such a manner, the electrolytic solution was prepared.

Note that for comparison, the electrolytic solution was prepared by a similar procedure except that the multi-nitrile compound was not used.

(Process of Assembling Secondary Battery)

First, the positive electrode 21 and the negative electrode 22 were stacked alternately with the separator 23 (a fine porous polyethylene film having a thickness of 25 μm) interposed therebetween to thereby form a stacked body. Thereafter, the exposed parts 21N were joined to each other and the exposed parts 22N were joined to each other by an ultrasonic welding method. Thereafter, the positive electrode lead 41 was coupled to the mutually joined exposed parts 21N, and the negative electrode lead 42 was coupled to the mutually joined exposed parts 22N by the ultrasonic welding method.

Thereafter, two pieces of film members 30A and 30B were prepared. As each of the film members 30A and 30B, a moisture-proof aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order. Thereafter, the stacked body was placed in the depression part 31, following which outer edges of three sides of the film member 30A (a thermal-fusion-bonding resin layer) and corresponding outer edges of three sides of the film member 30B (a thermal-fusion-bonding resin layer) were thermal-fusion-bonded to each other by a thermal-fusion-bonding method, to thereby contain the stacked body in the outer package film 30 having the pouch shape.

Lastly, the electrolytic solution was injected into the outer package film 30 having the pouch shape, following which the outer package film 30 was sealed by a thermal-fusion-bonding method. In this case, the sealing film 33 (a polypropylene film having a thickness of 15 μm) was interposed between the outer package film 30 and the positive electrode lead 41, and the sealing film 34 was interposed between the outer package film 30 and the negative electrode lead 42. The stacked body was thereby impregnated with the electrolytic solution. As a result, the battery device 20 which is the stacked electrode body was fabricated. Further, the battery device 20 was contained in the outer package film 30 while each of the positive electrode lead 41 and the negative electrode lead 42 was led out from inside to outside of the outer package film 30. In this manner, the battery device 20 was sealed in the outer package film 30, and the secondary battery 10 was thus assembled.

(Process of Stabilizing Secondary Battery)

The secondary battery 10 was charged and discharged for one cycle in a thermostatic chamber (at a temperature of 60° C.). Upon charging, the secondary battery 10 was charged with a constant current of 0.1 C until a voltage reached 4.2 V, following which the secondary battery 10 was charged with a constant voltage of 4.2 V until the current reached 0.05 C. Upon discharging, the secondary battery was discharged with a constant current of 0.1 C until the voltage reached 2.5 V. Note that 0.1 C is a value of a current that causes the battery capacity (a theoretical capacity) to be completely discharged in 10 hours, and 0.05 C is a value of a current that causes the battery capacity to be completely discharged in 20 hours. As a result, a film was formed on the surface of each of the positive electrode 21 and the negative electrode 22 to thereby electrochemically stabilize the state of the secondary battery 10. Thus, the secondary battery 10 of the laminated-film type was completed.

Evaluation of the performance (the capacity characteristic, the swelling characteristic, and the cyclability characteristic) of the secondary batteries 10 revealed the results presented in Tables 1 and 2.

(Capacity Characteristic)

In a case of examining the capacity characteristic, the secondary battery was charged and discharged in an ambient temperature environment (at a temperature of 23° C.) to thereby measure the battery capacity, i.e., a so-called initial capacity. Charging and discharging conditions were similar to the charging and discharging conditions in the process of stabilizing the secondary battery. Note that values of the battery capacities listed in Tables 1 and 2 are normalized values each obtained with respect to a value of the battery capacity in Experiment example 4 assumed as 100.

(Swelling Characteristic)

First, the secondary battery was charged in an ambient temperature environment, following which a thickness (a pre-storage thickness) of the secondary battery was measured. Thereafter, the secondary battery in a charged state was stored (for a storage period of 24 hours) in a thermostatic chamber (at a temperature of 60° C.), following which the thickness (a post-storage thickness) of the secondary battery was measured again. Lastly, the following was calculated: swelling rate (%)=[(post-storage thickness−pre-storage thickness)/pre-storage thickness]×100. Charging conditions were similar to the charging conditions in the process of stabilizing the secondary battery.

(Cyclability Characteristic)

First, the secondary battery was charged and discharged in an ambient temperature environment to thereby measure a discharge capacity (a first-cycle discharge capacity). Thereafter, the secondary battery was repeatedly charged and discharged in the same environment until the total number of cycles reached 300 to thereby measure the discharge capacity (a 300th-cycle discharge capacity). Lastly, the following was calculated: capacity retention rate (%)=(300th-cycle discharge capacity/first-cycle discharge capacity)×100. Charging and discharging conditions were similar to the charging and discharging conditions in the process of stabilizing the secondary battery, except that the current at the time of charging was changed to 1 C and the current at the time of discharging was changed to 3 C. Note that 1 C is a value of a current that causes the battery capacity to be completely discharged in 1 hour, and 3 C is a value of a current that causes the battery capacity to be completely discharged in ⅓ hours.

As described in Tables 1 and 2, in the secondary battery in which the positive electrode active material 100 included the center part 110 (the lithium-nickel composite oxide) and the covering part 120 (the boron compound), the capacity characteristic (the battery capacity), the swelling characteristic (the swelling rate), and the cyclability characteristic (the capacity retention rate) each varied depending on the configuration of the positive electrode active material 100 (the composition of the lithium-nickel composite oxide), the physical property of the positive electrode active material 100 (the crystallite size Z and the element concentration ratio R), and the composition of the electrolytic solution (presence or absence of the multi-nitrile compound).

That is, in a case where the electrolytic solution included no multi-nitrile compound (Experiment example 24), although a high battery capacity was obtained, the swelling rate increased and the capacity retention rate decreased. In contrast, in a case where the electrolytic solution included the multi-nitrile compound (Experiment examples 1 to 23), the battery capacity, the swelling rate, and the capacity retention rate each varied within a great range from inferior to superior depending on each of the composition of the lithium-nickel composite oxide, the crystallite size Z, and the element concentration ratio R.

Specifically, the swelling rate decreased and the capacity retention rate increased while the battery capacity was secured in a case where all of the following three conditions were satisfied (Experiment examples 2 to 6, 8 to 12, 15 to 18, 21, and 22), unlike in a case where not all of the three conditions were satisfied (Experiment examples 1, 7, 13, 14, 19, 20, and 23). The three conditions were: that the lithium-nickel composite oxide was the compound represented by Formula (1); that the crystallite size Z was within a range from 40.0 nm to 74.5 nm both inclusive; and that the element concentration ratio R was within a range from 0.15 to 0.90 both inclusive.

In the case where all of the three conditions were satisfied, a series of advantageous tendencies described below were obtained, in particular.

Firstly, if b in Formula (1) satisfied $0.1 \leq b \leq 0.2$, and therefore, 1−b satisfied $0.8 \leq 1-b \leq 0.9$ (Experiment examples 4 and 5), the swelling rate decreased sufficiently and the capacity retention rate increased sufficiently while a high battery capacity was maintained.

Secondly, the use of the dinitrile compound (succinonitrile) as the multi-nitrile compound resulted in a decrease in the swelling rate and an increase in the capacity retention rate while the battery capacity was secured, as described above.

Thirdly, if the crystallite size Z was within a range from 50.0 nm to 70.0 nm both inclusive (Experiment examples 4 and 9 to 11), the swelling rate decreased sufficiently and the capacity retention rate increased sufficiently while a high battery capacity was maintained.

Fourthly, if the element concentration ratio R was within a range from 0.3 to 0.6% both inclusive (Experiment examples 4, 16, and 17), the swelling rate decreased sufficiently and the capacity retention rate increased sufficiently while a high battery capacity was maintained.

Experiment Examples 25 to 48

As described in Tables 3 and 4, by a similar procedure except for changing each of the kind and the content (wt %) of the multi-nitrile compound, the secondary batteries 10 were each fabricated, following which the secondary batteries 10 were each evaluated for performance. Here, as the multi-nitrile compound, other dinitrile compounds were used, and trinitrile compounds were used as well. As the other dinitrile compounds, used were glutaronitrile (GN), adiponitrile (AN), pimelonitrile (PN), suberonitrile (SUN), sebaconitrile (SEN), and ethylene glycol bis(propionitrile) ether (EGPNE). As the trinitrile compounds, used were 1,3,5-cyclohexanetricarbonitrile (CHTCN) and 1,3,6-hexanetricarbonitrile (HTCN). Note that adiponitrile was used alone in some cases, and succinonitrile and adiponitrile were used in combination in other cases.

[Table 3]

TABLE 3

| Experiment example | Positive electrode active material | | Crystallite size Z (nm) | Element concentration ratio R | Multi-nitrile compound | | Battery capacity (Normalized) | Swelling rate (%) | Capacity retention rate (%) |
|---|---|---|---|---|---|---|---|---|---|
| | Center part (Lithium-nickel composite oxide) | Covering part (Boron compound) | | | Kind | Content (wt %) | | | |
| 25 | LiNi$_{0.80}$Co$_{0.15}$Al$_{0.05}$O$_2$ | H$_3$BO$_3$ | 52.0 | 0.40 | SN | 0.5 | 100 | 15 | 89 |
| 26 | | | | | | 1.0 | 100 | 11 | 88 |
| 4 | | | | | | 1.5 | 100 | 3 | 85 |
| 27 | | | | | | 2.0 | 100 | 4 | 86 |
| 28 | | | | | | 2.5 | 100 | 4 | 80 |
| 29 | | | | | | 3.0 | 100 | 4 | 74 |
| 30 | LiNi$_{0.80}$Co$_{0.15}$Al$_{0.05}$O$_2$ | H$_3$BO$_3$ | 52.0 | 0.40 | AN | 0.5 | 100 | 15 | 87 |
| 31 | | | | | | 1.0 | 100 | 11 | 86 |
| 32 | | | | | | 1.5 | 100 | 8 | 86 |
| 33 | | | | | | 2.0 | 100 | 5 | 85 |
| 34 | | | | | | 2.5 | 100 | 4 | 79 |
| 35 | | | | | | 3.0 | 100 | 3 | 73 |

[Table 4]

TABLE 4

| Experiment example | Positive electrode active material | | Crystallite size Z (nm) | Element concentration ratio R | Multi-nitrile compound | | Battery capacity (Normalized) | Swelling rate (%) | Capacity retention rate (%) |
|---|---|---|---|---|---|---|---|---|---|
| | Center part (Lithium-nickel composite oxide) | Covering part (Boron compound) | | | Kind | Content (wt %) | | | |
| 36 | LiNi$_{0.80}$Co$_{0.15}$Al$_{0.05}$O$_2$ | H$_3$BO$_3$ | 52.0 | 0.40 | SN + AN | 0.25 + 0.25 | 100 | 6 | 88 |
| 37 | | | | | | 0.5 + 0.5 | 100 | 4 | 87 |
| 38 | | | | | | 0.75 + 0.75 | 100 | 3 | 85 |
| 39 | | | | | | 1.0 + 1.0 | 100 | 3 | 86 |
| 40 | | | | | | 1.25 + 1.25 | 100 | 2 | 82 |
| 41 | | | | | | 1.50 + 1.50 | 100 | 3 | 83 |
| 42 | | | | | GN | 1.5 | 100 | 7 | 85 |
| 43 | | | | | PN | | 100 | 11 | 84 |
| 44 | | | | | SUN | | 100 | 15 | 83 |
| 45 | | | | | SEN | | 100 | 15 | 81 |
| 46 | | | | | EGPNE | | 100 | 7 | 79 |
| 47 | | | | | CHTCN | | 100 | 6 | 80 |
| 48 | | | | | HTCN | | 100 | 9 | 81 |

As described in Tables 3 and 4, in a case where the dinitrile compound was used (Experiment examples 25 to 46) and in a case where the trinitrile compound was used (Experiment examples 47 and 48), the swelling rate decreased and the capacity retention rate increased while the battery capacity was secured as in Experiment example 4 described above.

In addition, if the content of the multi-nitrile compound in the electrolytic solution was within a range from 0.5 wt % to 3.0 wt % both inclusive (Experiment examples 4 and 25 to 35), the swelling rate decreased sufficiently and the capacity retention rate increased sufficiently while the battery capacity was secured. In this case, if the content of the multi-nitrile compound in the electrolytic solution was within a range from 1.5 wt % to 2.0 wt % both inclusive (Experiment examples 4, 27, 32, and 33), the swelling rate further decreased.

Based upon the results presented in Tables 1 to 4, in a case where: the positive electrode active material of the positive electrode included the lithium-nickel composite oxide and the boron compound; the electrolytic solution included the multi-nitrile compound; the crystallite size Z of the (104) plane of the positive electrode active material was within a range from 40.0 nm to 74.5 nm both inclusive; and the element concentration ratio R of the positive electrode active material was within a range from 0.15 to 0.90 both inclusive, the swelling rate decreased and the capacity retention rate increased while the battery capacity was secured. Accordingly, a superior capacity characteristic, a superior swelling characteristic, and a superior cyclability characteristic of the secondary battery were obtained.

Although the present technology has been described herein, the configuration of the technology is not limited thereto, and is therefore modifiable in a variety of suitable ways.

Although the description has been given of the case where the secondary battery has a battery structure of the laminated-film type, the battery structure is not particularly limited. Specifically, the battery structure may be of any other type, such as a cylindrical type, a prismatic type, a coin type, or a button type.

Further, although the description has been given of the case where the battery device has a device structure of the stacked type, the device structure of the battery device is not particularly limited. Specifically, the device structure may be of any other type, such as a wound type in which the electrodes (the positive electrode and the negative electrode)

are wound or a zigzag folded type in which the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode including a positive electrode active material;
a negative electrode; and
an electrolytic solution including a multi-nitrile compound, wherein
the positive electrode active material includes a lithium-nickel composite oxide and a boron compound, the lithium-nickel composite oxide having a layered rock-salt crystal structure represented by Formula (1) below,
the positive electrode active material has a crystallite size of a (104) plane that is greater than or equal to 40.0 nanometers and less than or equal to 74.5 nanometers, the crystallite size being calculated by X-ray diffractometry and Scherrer equation, and
the positive electrode active material has an element concentration ratio represented by Expression (2) below that is greater than or equal to 0.15 and less than or equal to 0.90, the element concentration ratio being calculated on a basis of a B1s spectrum, a Ni2p$_{3/2}$ spectrum, a Co2p$_{3/2}$ spectrum, a Mn2p$_{1/2}$ spectrum, and an Al2s spectrum of the positive electrode active material detected by X-ray photoelectron spectroscopy, $$Li_aNi_{1-b}M_bO_c \qquad (1)$$

where
M is at least one of Co, Fe, Mn, Cu, Zn, Al, Cr, V, Ti, Mg, or Zr, and
a, b, and c satisfy 0.8<a<1.2, 0≤b≤0.5, and 0<c<3,

$$R = I2/I1 \qquad (2)$$

where
R is the element concentration ratio,
I1 is sum total of a Ni concentration in atomic percent, a Co concentration in atomic percent, a Mn concentration in atomic percent, and an Al concentration in atomic percent that are calculated on a basis of the Ni2p$_{3/2}$ spectrum, the Co2p$_{3/2}$ spectrum, the Mn2p$_{1/2}$ spectrum, and the Al2s spectrum, respectively, and
I2 is a B concentration in atomic percent calculated on a basis of the B1s spectrum.

2. The secondary battery according to claim 1, wherein the positive electrode active material includes
a center part including the lithium-nickel composite oxide, and
a covering part covering a surface of the center part and including the boron compound.

3. The secondary battery according to claim 1, wherein b in the Formula (1) satisfies 0.1≤b≤0.2.

4. The secondary battery according to claim 1, wherein
the multi-nitrile compound includes a dinitrile compound, a trinitrile compound, or both,
the dinitrile compound includes at least one of succinonitrile, glutaronitrile, adiponitrile, pimelonitrile, suberonitrile, sebaconitrile, or ethylene glycol bis(propionitrile) ether, and
the trinitrile compound includes 1,3,5-cyclohexanetricarbonitrile, 1,3,6-hexanetricarbonitrile, or both.

5. The secondary battery according to claim 1, wherein the crystallite size is greater than or equal to 50.0 nanometers and less than or equal to 70.0 nanometers.

6. The secondary battery according to claim 1, wherein the element concentration ratio is greater than or equal to 0.30 and less than or equal to 0.60.

7. The secondary battery according to claim 1, wherein a content of the multi-nitrile compound in the electrolytic solution is greater than or equal to 0.5 weight percent and less than or equal to 3.0 weight percent.

8. The secondary battery according to claim 7, wherein the content of the multi-nitrile compound in the electrolytic solution is greater than or equal to 1.5 weight percent and less than or equal to 2.0 weight percent.

9. The secondary battery according to claim 1, further comprising an outer package member having flexibility and containing the positive electrode, the negative electrode, and the electrolytic solution.

10. The secondary battery according to claim 1, wherein the secondary battery comprises a lithium-ion secondary battery.

11. The secondary battery according to claim 1, wherein, in Formula (1), M is Al and Co.

* * * * *